(12) United States Patent
Yoshida et al.

(10) Patent No.: US 9,873,085 B2
(45) Date of Patent: Jan. 23, 2018

(54) CATALYTIC CONVERTER

(71) Applicant: TOYOTA JIDOSHA KABUSHIKI KAISHA, Toyota-shi, Aichi (JP)

(72) Inventors: Takeru Yoshida, Miyoshi (JP); Hiromasa Suzuki, Toyota (JP); Yuki Aoki, Seto (JP); Isao Chinzei, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/446,204

(22) Filed: Mar. 1, 2017

(65) Prior Publication Data

US 2017/0296968 A1 Oct. 19, 2017

(30) Foreign Application Priority Data

Apr. 13, 2016 (JP) .................. 2016-080566

(51) Int. Cl.
*B01J 21/04* (2006.01)
*B01J 21/06* (2006.01)
(Continued)

(52) U.S. Cl.
CPC ..... *B01D 53/9468* (2013.01); *B01D 53/9472* (2013.01); *B01J 23/10* (2013.01);
(Continued)

(58) Field of Classification Search
CPC . B01J 21/04; B01J 21/066; B01J 23/10; B01J 23/40; B01J 23/42; B01J 23/44; B01J 23/46; B01J 23/63; B01J 35/04
See application file for complete search history.

(56) References Cited

U.S. PATENT DOCUMENTS 5,139,992 A * 8/1992 Tauster .............. B01D 53/945
423/213.5
5,318,757 A * 6/1994 Abe .................... B01D 53/945
422/173
(Continued)

FOREIGN PATENT DOCUMENTS

JP 3688974 B2 8/2005
JP 4217576 B2 2/2009
(Continued)

*Primary Examiner* — Cam N. Nguyen
(74) *Attorney, Agent, or Firm* — Sughrue Mion, PLLC

(57) ABSTRACT

A catalytic converter with excellent OSC performance and $NO_x$ purification performance. The catalytic converter includes a substrate with a cell structure and a catalyst layer formed on a cell wall surface of the substrate. The catalyst layer has a catalyst layer arranged on the upstream side and a catalyst layer arranged on the downstream side in an exhaust gas flow direction on the substrate. The catalyst layer on the upstream side includes a support containing an $Al_2O_3$—$CeO_2$—$ZrO_2$ ternary composite oxide (ACZ material) and an $Al_2O_3$—$ZrO_2$ binary composite oxide (AZ material), and at least Rh that is a noble metal catalyst carried on the support, and the catalyst layer on the downstream side includes a support and Pd or Pt that is a noble metal catalyst carried on the support. In the support in the catalyst layer on the upstream side, the mass proportion of ACZ material/(ACZ material+AZ material) is in the range of 0.33 to 0.5, and greater than or equal to 75% mass Rh is carried on the $Al_2O_3$—$ZrO_2$ binary composite oxide of the support.

3 Claims, 5 Drawing Sheets

(51) Int. Cl.
*B01J 23/10* (2006.01)
*B01J 23/40* (2006.01)
*B01J 23/42* (2006.01)
*B01J 23/44* (2006.01)
*B01J 23/46* (2006.01)
*B01J 23/63* (2006.01)
*B01J 35/04* (2006.01)
*B01D 53/94* (2006.01)
*F01N 3/28* (2006.01)

(52) U.S. Cl.
CPC ............. *B01J 23/42* (2013.01); *B01J 23/44* (2013.01); *B01J 23/63* (2013.01); *B01J 35/04* (2013.01); *F01N 3/2803* (2013.01); *B01D 2255/1021* (2013.01); *B01D 2255/1023* (2013.01); *B01D 2255/1025* (2013.01); *B01D 2255/2065* (2013.01); *B01D 2255/2092* (2013.01); *B01D 2255/20715* (2013.01); *B01D 2255/407* (2013.01); *B01D 2255/908* (2013.01); *B01D 2255/9022* (2013.01); *B01D 2255/9025* (2013.01); *B01D 2255/9032* (2013.01); *F01N 2510/068* (2013.01)

(56) References Cited

U.S. PATENT DOCUMENTS

| | | | | |
|---|---|---|---|---|
| 5,376,610 A * | 12/1994 | Takahata | ............. | B01J 37/0244 423/213.7 |
| 6,087,298 A * | 7/2000 | Sung | ............. | B01D 53/945 502/303 |
| 6,808,687 B1 | 10/2004 | Uenishi et al. | | |
| 7,276,212 B2 * | 10/2007 | Hu | ............. | B01D 53/9454 422/168 |
| 7,517,510 B2 * | 4/2009 | Chen | ............. | B01D 53/945 422/168 |
| 7,550,124 B2 * | 6/2009 | Chen | ............. | B01D 53/945 422/168 |
| 7,758,834 B2 * | 7/2010 | Chen | ............. | B01D 53/945 423/213.2 |
| 7,795,172 B2 * | 9/2010 | Foong | ............. | B01D 53/945 502/302 |
| 7,922,988 B2 * | 4/2011 | Deeba | ............. | B01D 53/945 422/168 |
| 8,637,426 B2 * | 1/2014 | Hoke | ............. | B01D 53/945 502/333 |
| 8,640,440 B2 * | 2/2014 | Klingmann | ............. | B01D 53/944 422/170 |
| 8,758,695 B2 * | 6/2014 | Neubauer | ............. | B01D 53/944 422/177 |
| 9,266,092 B2 * | 2/2016 | Arnold | ............. | B01J 23/63 |
| 9,579,633 B2 * | 2/2017 | Suzuki | ............. | B01D 53/9468 |
| 9,597,660 B2 * | 3/2017 | Aoki | ............. | B01J 23/10 |
| 9,731,275 B2 * | 8/2017 | Aoki | ............. | B01J 35/04 |
| 9,744,529 B2 * | 8/2017 | Xue | ............. | B01J 35/0006 |
| 9,764,286 B2 * | 9/2017 | Cavataio | ............. | B01D 53/9431 |
| 2005/0070428 A1 | 3/2005 | Kawamoto et al. | | |
| 2009/0275468 A1 | 11/2009 | Taki et al. | | |

FOREIGN PATENT DOCUMENTS

| | | |
|---|---|---|
| JP | 4838258 B2 | 12/2011 |
| JP | 5322596 B2 | 10/2013 |

* cited by examiner

US 9,873,085 B2

CATALYTIC CONVERTER

CLAIM OF PRIORITY

The present application claims priority from Japanese patent application JP 2016-080566 filed on Apr. 13, 2016, the content of which is hereby incorporated by reference into this application.

BACKGROUND

Technical Field

The present disclosure relates to a catalytic converter that is fixedly housed in a pipe of an exhaust system for exhaust gas.

Background Art

In a variety of industries, a variety of attempts has been made worldwide to reduce environmental impacts and burdens. In particular, in the automobile industry, development for promoting the spread of not only fuel-efficient gasoline engine vehicles, but also so-called eco-friendly vehicles, such as hybrid vehicles and electric vehicles, as well as for further improving the performance of such vehicles has been advanced day by day. In addition to the development of such eco-friendly vehicles, research about an exhaust gas purifying catalyst for purifying exhaust gas discharged from an engine has also been actively conducted. An exhaust gas purifying catalyst contains an oxidation catalyst, a three-way catalyst, a $NO_x$ storage-reduction catalyst, and the like. A noble metal catalyst, such as platinum (Pt), palladium (Pd), or rhodium (Rh), exhibits catalytic activity in the exhaust gas purifying catalyst. The noble metal catalyst is typically used while being carried on a support that is made of porous oxide, such as alumina ($Al_2O_3$).

A catalytic converter for purifying exhaust gas is typically arranged in an exhaust system for exhaust gas that connects a vehicle engine and a muffler. The engine may sometimes discharge environmentally harmful substances, such as CO, $NO_x$, and unburned HC and VOC. In order to convert such harmful substances into allowable substances, exhaust gas is passed through a catalytic converter in which a catalyst layer, which has a noble metal catalyst, such as Rh, Pd, or Pt carried on a support, is arranged on the cell wall surface of a substrate, so that CO is converted into $CO_2$, and $NO_x$ is converted into $N_2$ and $O_2$, while VOC is burned to generate $CO_2$ and $H_2O$.

As a support on which a noble metal catalyst is carried, a $CeO_2$—$ZrO_2$ solid solution (which is also referred to as a CZ material, a cerium oxide (ceria)-zirconia-based composite oxide, and the like) can be used. This is also referred to as a promoter, and is an essential component of the aforementioned three-way catalyst for concurrently removing CO, $NO_x$, and HC that are harmful components in the exhaust gas. Examples of the essential component of the promoter include $CeO_2$. $CeO_2$ has a property that its oxidation number changes to $Ce^{3+}$ or $Ce^{4+}$, for example, depending on the partial pressure of oxygen in the exhaust gas to which $CeO_2$ is exposed, and has a function of absorbing and releasing oxygen as well as a function of storing oxygen (OSC: Oxygen Storage Capacity) to compensate for the deficiency and excess of electric charges. In addition, $CeO_2$ can absorb and mitigate fluctuations of the exhaust gas atmosphere and maintain the air/fuel ratio at a level around the theoretical air/fuel ratio in order to retain a purifying window of the three-way catalyst.

By the way, how to reduce the amount of a noble metal catalyst used in the aforementioned three-way catalyst is an important element to be considered from the perspective of reduction in the material risk of rare metal and the like and cost competitiveness. However, when the amount of a noble metal catalyst in a three-way catalyst is significantly reduced, the catalytic activity also decreases significantly. This results in significantly degraded OSC performance and low-temperature activity as well as significantly degraded $NO_x$ purification performance under a high-temperature environment, and the like. This occurs because a significantly reduced amount of a noble metal catalyst results in a significantly reduced number of active sites, and a significantly reduced number of catalytic reaction sites results in significantly degraded purification performance.

Among noble metal catalysts, such as Pt, Pd, and Rh, that are particularly used for a three-way catalyst, Rh is the most excellent in the $NO_x$ purification performance, but is sold at the highest market price per unit weight. It has been known that when Rh is carried on a support that contains cerium oxide (ceria), higher OSC performance is exhibited. To the contrary, it has been also known that increasing the amount of cerium oxide of the support will degrade the $NO_x$ purification performance that is a characteristic of Rh. Thus, when Rh is used as a noble metal catalyst for a three-way catalyst, designing guidelines are needed for the production of a three-way catalyst that is optimal in both the OSC performance and the $NO_x$ purification performance.

Herein, Patent Document 1 discloses an exhaust gas purifying catalyst that includes a support and a catalyst layer formed on the support, in which the catalyst layer contains active $Al_2O_3$ on which Pt or Pd is carried, a $CeO_2$—$ZrO_2$—$Nd_2O_3$ composite oxide on which Rh is carried, $ZrO_2$-coated $Al_2O_3$ on which Rh is carried, and a binder material in a mixed state, and in the $ZrO_2$-coated $Al_2O_3$, the mass ratio of $ZrO_2/Al_2O_3$ is 5/95 to 15/85.

Further, Patent Document 2 discloses an exhaust gas purifying catalyst that includes a support substrate, a lower catalyst layer formed on the surface of the support substrate, and an upper catalyst layer formed on the surface of the lower catalyst layer, in which the lower catalyst layer has at least one of Pt or Pd carried thereon and the upper catalyst layer has at least Rh carried thereon. In the exhaust gas purifying catalyst, the lower catalyst layer and the upper catalyst layer both contain ceria and zirconia at a molar ratio ($CeO_2/ZrO_2$) in the range of 20/80 to 40/60, the molar ratio ($CeO_2/ZrO_2$) of the lower catalyst layer is greater than or equal to the molar ratio ($CeO_2/ZrO_2$) of the upper catalyst layer, and at least one of Pt or Pd carried on the lower catalyst layer is carried only on ceria or a composite oxide containing ceria, while Rh carried on the upper catalyst layer is carried only on zirconia or a composite oxide containing zirconia.

Furthermore, Patent Document 3 discloses an exhaust gas purifying catalyst including a catalyst substrate and a catalyst coating layer that is formed on the catalyst substrate and contains noble metal and a refractory inorganic oxide. In the exhaust gas purifying catalyst, the catalyst coating layer has a layered structure including an A-layer and a B-layer. The A-layer contains Pd and Pt as the noble metal at a weight ratio of 3:1 to 20:1. The B-layer contains Rh as the noble metal. The A-layer contains, as the refractory inorganic oxide, (a) alumina and (b) a cerium-zirconium composite oxide in which a relative proportion of $ZrO_2$ is 40 to 95 mass %. The weight ratio of (a) to (b) is in the range of 1:1 to 1:5.

Moreover, Patent Document 4 discloses an exhaust gas purifying catalyst in which a first coating layer is formed on a heat-resistant support carrier and a second coating layer is formed on the first coating layer. In the exhaust gas purifying catalyst, the first coating layer contains alumina on which palladium is carried and the second coating layer contains a Ce—Zr-based composite oxide on which platinum and rhodium are carried in a coexisting state and also contains a Zr—Ce-based composite oxide that is different in composition from the aforementioned Ce—Zr-based composite oxide and on which platinum and rhodium are carried in a coexisting state.

RELATED ART DOCUMENTS

Patent Documents

Patent Document 1: JP 4217576 B
Patent Document 2: JP 5322596 B
Patent Document 3: JP 4838258 B
Patent Document 4: JP 3688974 B

SUMMARY

Patent Documents 1 to 4 each disclose an exhaust gas purifying catalyst in which Rh is used as a noble metal catalyst, but do not disclose the realization of an exhaust gas purifying catalyst that is optimal in both the OSC performance and the $NO_x$ purification performance as described above.

The present disclosure has been made in view of the foregoing, and it is an object of the present disclosure to provide a catalytic converter with excellent OSC performance and $NO_x$ purification performance.

In order to achieve the above object, a catalytic converter in accordance with an embodiment of the present disclosure includes a substrate with a cell structure through which exhaust gas flows and a catalyst layer formed on a cell wall surface of the substrate, in which the catalyst layer has a catalyst layer on the upstream side that is arranged on the upstream side in the exhaust gas flow direction on the substrate and a catalyst layer on the downstream side that is arranged on the downstream side in the exhaust gas flow direction on the substrate; the catalyst layer on the upstream side includes a support that contains an $Al_2O_3$—$CeO_2$—$ZrO_2$ ternary composite oxide and an $Al_2O_3$—$ZrO_2$ binary composite oxide, and at least Rh that is a noble metal catalyst carried on the support; the catalyst layer on the downstream side includes a support and Pd or Pt that is a noble metal catalyst carried on the support; in the support in the catalyst layer on the upstream side, the mass proportion of $Al_2O_3$—$CeO_2$—$ZrO_2$ ternary composite oxide/($Al_2O_3$—$CeO_2$—$ZrO_2$ ternary composite oxide+$Al_2O_3$—$ZrO_2$ binary composite oxide) is in the range of 0.33 to 0.5; and in the catalyst layer on the upstream side, greater than or equal to 75 mass % Rh is carried on the $Al_2O_3$—$ZrO_2$ binary composite oxide of the support.

The catalyst layer of the catalytic converter of the present disclosure is a so-called zone-coated catalyst layer including a catalyst layer on the upstream side arranged on the upstream side in the exhaust gas flow direction on the substrate and a catalyst layer on the downstream side arranged on the downstream side in the exhaust gas flow direction on the substrate.

The support that is included in the catalyst layer on the upstream side contains an $Al_2O_3$—$CeO_2$—$ZrO_2$ ternary composite oxide (ACZ material) and an $Al_2O_3$—$ZrO_2$ binary composite oxide (AZ material). The inventors proved that with the mass proportion of $Al_2O_3$—$CeO_2$—$ZrO_2$ ternary composite oxide/($Al_2O_3$—$CeO_2$—$ZrO_2$ ternary composite oxide+$Al_2O_3$—$ZrO_2$ binary composite oxide) in the range of 0.33 to 0.5, the catalytic converter that is excellent in both the OSC performance and the low-temperature activity performance ($NO_x$ purification performance) is realized.

Further, the inventors proved that with greater than or equal to 75 mass % Rh being carried on the $Al_2O_3$—$ZrO_2$ binary composite oxide of the support in the catalyst layer on the upstream side, the catalytic converter that is excellent in both the OSC performance and the $NO_x$ purification performance is realized. Such a converter was realized because in order to deal with the problem that with a greater content of $CeO_2$ in the support in the catalyst layer on the upstream side, the $NO_x$ purification performance, which is a characteristic of Rh, would degrade, greater than or equal to 75 mass % Rh was carried on the $Al_2O_3$—$ZrO_2$ binary composite oxide that does not contain $CeO_2$ in the support, so that the degradation of the $NO_x$ purification performance was suppressed.

Herein, as the substrate with a cell structure, it is possible to use, in addition to cordierite made of a composite oxide of magnesium oxide, aluminum oxide, and silicon dioxide, or ceramic materials, such as silicon carbide, materials other than ceramic materials, such as metal materials. In addition, the substrate may have a so-called honeycomb structure with a number of cells whose lattice contour is a quadrangle, a hexagon, an octagon, or the like.

Furthermore, "at least Rh that is a noble metal catalyst" means that the catalyst layer on the upstream side contains, as the noble metal catalyst, one or more of Rh, Rh/Pd, Rh/Pt, and Rh/Pt/Pd. The "Pd or Pt that is a noble metal catalyst" means that the catalyst layer on the downstream side contains, as the noble metal catalyst, one or more of Pd, Pt, and Pd/Pt.

The catalyst layer may be configured so as to have entirely a single layer structure in which the catalyst layer on the upstream side and the catalyst layer on the downstream side do not overlap with each other, and may also be configured such that the catalyst layer on the upstream side and the catalyst layer on the downstream side partially overlap with each other and in the portion where the catalyst layers overlap with each other, the catalyst layer on the downstream side is arranged on the surface of the substrate and the catalyst layer on the upstream side is arranged on the surface of the catalyst layer on the downstream side. Examples of the configuration in which the catalyst layer on the upstream side and the catalyst layer on the downstream side do not overlap with each other include a configuration in which the lengths of the catalyst layer on the upstream side and the catalyst layer on the downstream side are both 50% of the total length of the substrate, and a configuration in which the lengths of the catalyst layer on the upstream side and the catalyst layer on the downstream side are 60% and 40% of the total length of the substrate, respectively. Further, examples of the configuration in which the catalyst layer on the upstream side and the catalyst layer on the downstream side partially overlap with each other include a configuration in which the length of the catalyst layer on the upstream side is 60% of the total length of the substrate from an exhaust gas inlet end of the substrate and the length of the catalyst layer on the downstream side is also 60% of the total length of the substrate from an exhaust gas outlet end of the substrate, and 20% of the length of the catalyst layer on the upstream side and 20% of the length of the catalyst layer on the downstream side overlap with each other.

Further, a catalytic converter in accordance with another embodiment of the present disclosure includes a substrate with a cell structure through which exhaust gas flows, and a catalyst layer formed on a cell wall surface of the substrate, in which the catalyst layer has a lower catalyst layer that is arranged on the surface of the substrate and an upper catalyst layer that is arranged on the surface of the lower catalyst layer; the upper catalyst layer includes a support that contains an $Al_2O_3$—$CeO_2$—$ZrO_2$ ternary composite oxide and an $Al_2O_3$—$ZrO_2$ binary composite oxide, and at least Rh that is a noble metal catalyst carried on the support; the lower catalyst layer includes a support and Pd or Pt that is a noble metal catalyst carried on the support; in the support in the upper catalyst layer, the mass proportion of $Al_2O_3$—$CeO_2$—$ZrO_2$ ternary composite oxide/($Al_2O_3$—$CeO_2$—$ZrO_2$ ternary composite oxide+$Al_2O_3$—$ZrO_2$ binary composite oxide) is in the range of 0.33 to 0.5; and in the upper catalyst layer, greater than or equal to 75 mass % Rh is carried on the $Al_2O_3$—$ZrO_2$ binary composite oxide of the support.

The catalytic converter of the present embodiment has a two-layer structure of a lower catalyst layer and an upper catalyst layer, in which the upper catalyst layer and the lower catalyst layer are configured similarly to the aforementioned catalyst layer on the upstream side and catalyst layer on the downstream side, respectively. The upper catalyst layer first contacts exhaust gas as does the aforementioned catalyst layer on the upstream side, while the lower catalyst layer contacts the exhaust gas that the upper catalyst layer has already contacted as the aforementioned catalyst layer on the downstream side contacts the exhaust gas that the catalyst layer on the upstream side has already contacted. Thus, the catalytic converter of the present embodiment exhibits the same functions and effects as those of the catalytic converter that has the catalyst layer on the upstream side and the catalyst layer on the downstream side.

As the upper catalyst layer is configured similarly to the catalyst layer on the upstream side, a catalytic converter that is excellent in both the OSC performance and the $NO_x$ purification performance is realized.

The catalytic converter of the present disclosure preferably has a cordierite honeycomb support with excellent resistance to thermal shock. Alternatively, the catalytic converter may be an electrically heated catalytic converter (EHC). The electrically heated catalytic converter of this type has a honeycomb catalyst and a pair of electrodes attached thereto, for example. When current is supplied to the pair of electrodes to heat the honeycomb catalyst, the activity of the honeycomb catalyst is increased, so that exhaust gas passing through the honeycomb catalyst is detoxified. When such a converter is applied to an exhaust system for exhaust gas that connects a vehicle engine and a muffler, it is possible to purify exhaust gas in the normal operation and also purify exhaust gas at cold temperature by activating the catalyst through electric heating.

As can be understood from the foregoing description, in the catalytic converter of the present disclosure, the catalyst layer on the upstream side (in the configuration in which the catalyst layer has the catalyst layers on the upstream side and the downstream side) and the upper catalyst layer (in the configuration in which the catalyst layer has the two-layer structure of the lower catalyst layer and the upper catalyst layer) each have a support that contains an $Al_2O_3$—$CeO_2$—$ZrO_2$ ternary composite oxide and an $Al_2O_3$—$ZrO_2$ binary composite oxide, and at least Rh that is a noble metal catalyst carried on the support. Further, the mass proportion of $Al_2O_3$—$CeO_2$—$ZrO_2$ ternary composite oxide/($Al_2O_3$—$CeO_2$—$ZrO_2$ ternary composite oxide+$Al_2O_3$—$ZrO_2$ binary composite oxide) is in the range of 0.33 to 0.5, and greater than or equal to 75 mass % Rh is carried on the $Al_2O_3$—$ZrO_2$ binary composite oxide of the support, so that a catalytic converter that is excellent in both the OSC performance and the $NO_x$ purification performance is realized.

DETAILED DESCRIPTION OF THE EMBODIMENT(S)

Figure 1:
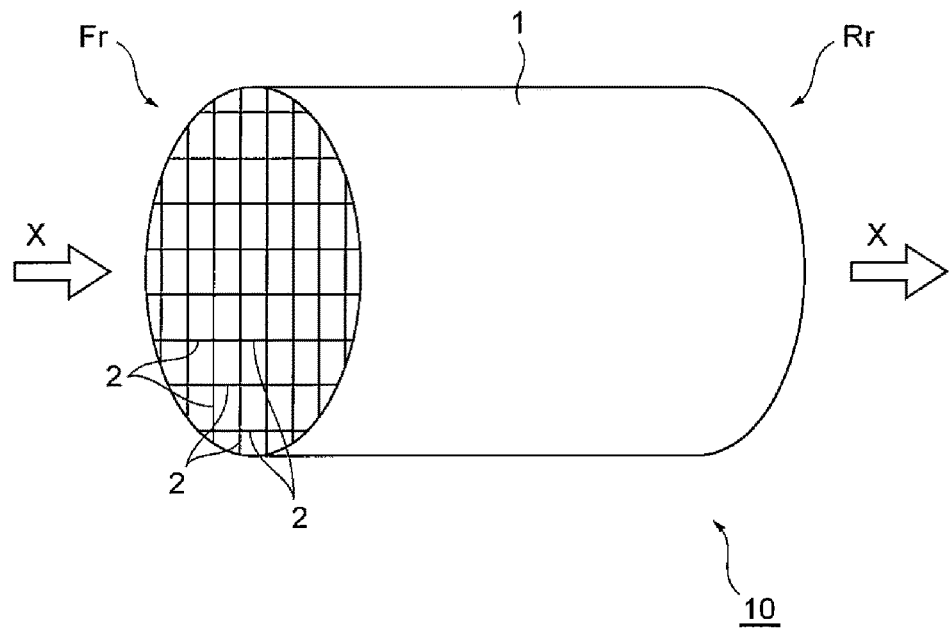
FIG. 1 is a schematic view of a catalytic converter of the present disclosure.
Figure 2:
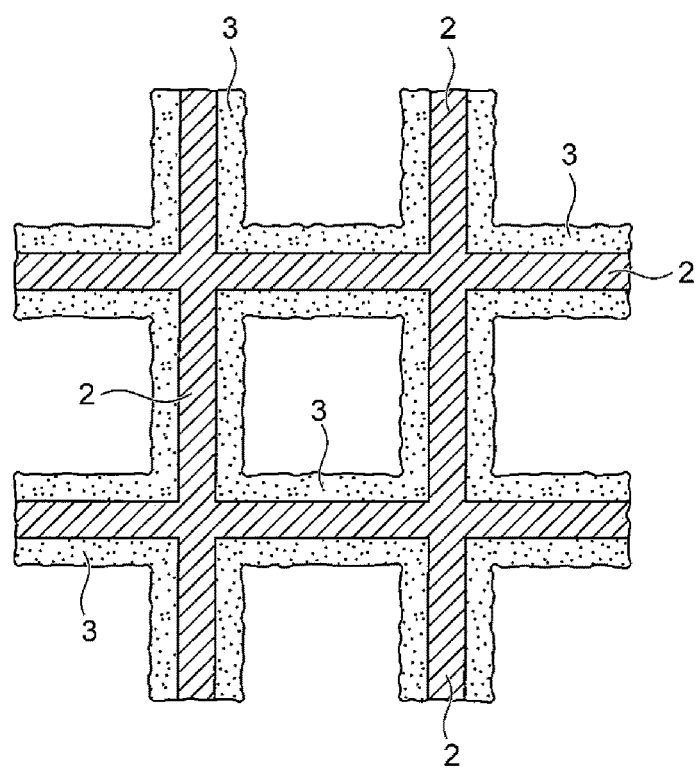
FIG. 2 is a partially enlarged view of a cell.
Figure 3:
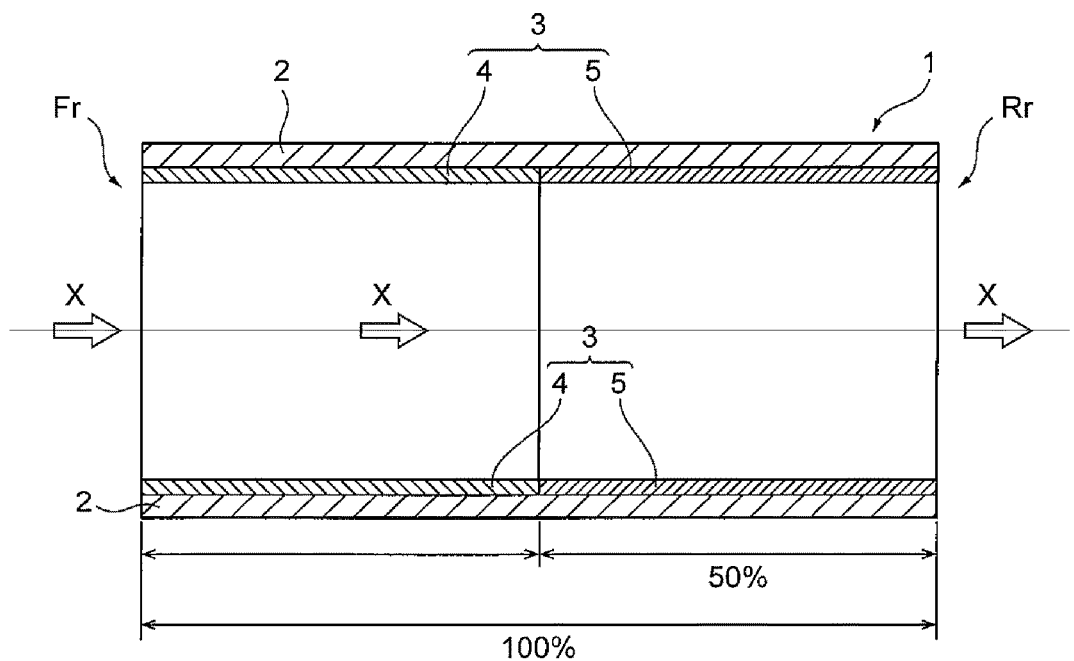
FIG. 3 is a longitudinal sectional view illustrating Embodiment 1 of a catalyst layer.
Figure 4:
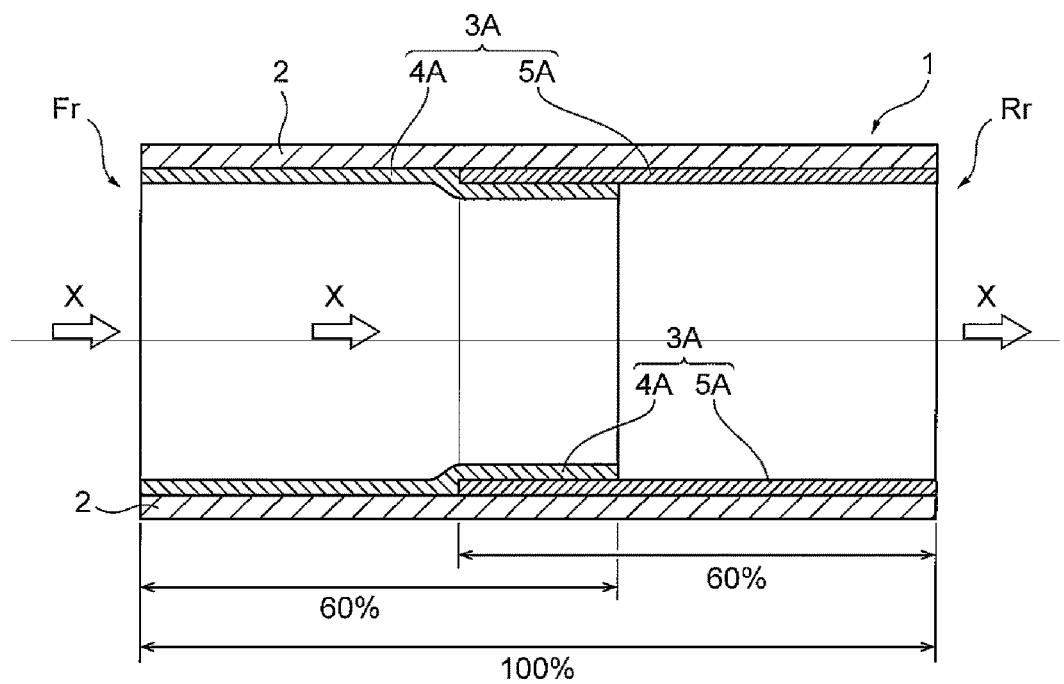
FIG. 4 is a longitudinal sectional view illustrating Embodiment 2 of a catalyst layer.
Figure 5:
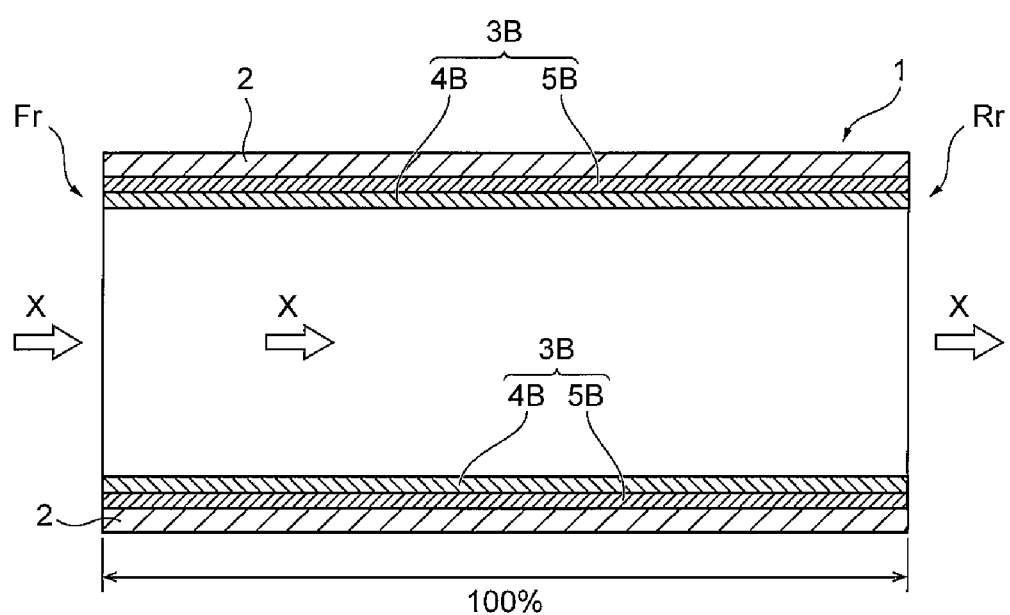
FIG. 5 is a longitudinal sectional view illustrating Embodiment 3 of a catalyst layer.

Hereinafter, embodiments of a catalytic converter of the present disclosure will be described with reference to the drawings.
(Exhaust System for Exhaust Gas)
First, an exhaust system for exhaust gas in which the catalytic converter of the present disclosure is provided will be briefly described. An exhaust system for exhaust gas to which the catalytic converter of the present disclosure is applied has a configuration in which an engine, a catalytic converter, a three-way catalytic converter, a sub-muffler, and a main muffler are arranged and are mutually connected with system pipes so that exhaust gas generated in the engine flows through each part via the system pipe and is then discharged. Next, an embodiment of the catalytic converter will be described.
(Embodiment of Catalytic Converter)
FIG. 1 is a schematic view of the catalytic converter of the present disclosure. FIG. 2 is a partially enlarged view of a cell. Each of FIGS. 3 to 5 is a longitudinal sectional view illustrating an embodiment of a catalyst layer.

A catalytic converter 10 shown in FIG. 1 generally includes a cylindrical substrate 1 with a number of cells and a catalyst layer 3 (see FIG. 2) formed on the surface of a cell wall 2 of each cell.

Herein, examples of the substrate 1 include cordierite made of a composite oxide of magnesium oxide, aluminum oxide, and silicon dioxide, ceramic materials, such as silicon carbide, and materials other than ceramic materials, such as metal materials.

The substrate 1 has a honeycomb structure with a number of cells whose lattice contour is a quadrangle, a hexagon, an octagon, or the like. Exhaust gas, which has entered a cell at an end of the substrate 1 on the upstream side (Fr side) in the exhaust gas flow direction, flows through the substrate 1, and is purified in the circulation process, and then, the purified exhaust gas flows out from an end of the substrate 1 on the downstream side (Rr side) in the exhaust gas flow direction (X-direction).

Next, embodiments of a catalyst layer will be described with reference to FIGS. 3 to 5.

The catalyst layer 3 shown in FIG. 3 is a zone-coated catalyst layer that has a catalyst layer 4 on the upstream side arranged on the upstream side in the exhaust gas flow direction on the substrate 1 and a catalyst layer 5 on the downstream side arranged on the downstream side in the exhaust gas flow direction on the substrate 1.

The lengths of the catalyst layer 4 on the upstream side and the catalyst layer 5 on the downstream side are both 50% of the total length of the substrate 1 as 100%. It should be noted that other than the embodiment shown in the drawing, it is also possible to adopt an embodiment in which, for example, the lengths of the catalyst layer 4 on the upstream side and the catalyst layer 5 on the downstream side are 60% and 40% of the total length of the substrate 1, respectively.

The catalyst layer 4 on the upstream side includes a support that contains an $Al_2O_3$—$CeO_2$—$ZrO_2$ ternary composite oxide (ACZ material) and an $Al_2O_3$—$ZrO_2$ binary composite oxide (AZ material), and at least Rh that is a noble metal catalyst carried on the support.

Examples of the embodiment in which at least Rh is contained as a noble metal catalyst include one or more of Rh, Rh/Pd, Rh/Pt, and Rh/Pt/Pd.

Meanwhile, the catalyst layer 5 on the downstream side includes a support that contains $Al_2O_3$, $CeO_2$—$ZrO_2$ (CZ material), and the like, and Pd or Pt that is a noble metal catalyst carried on the support. It should be noted that the type of support in the catalyst layer 5 on the downstream side is not particularly limited, and any type of support commonly used for exhaust gas catalysts may be adopted.

Examples of the embodiment in which Pd or Pt is contained as a noble metal catalyst include one or more of Pd, Pt, and Pd/Pt.

In the support containing the $Al_2O_3$—$CeO_2$—$ZrO_2$ ternary composite oxide (ACZ material) and the $Al_2O_3$—$ZrO_2$ binary composite oxide (AZ material) in the catalyst layer 4 on the upstream side, the mass proportion of ACZ material/(ACZ material+AZ material) is in the range of 0.33 to 0.5. Further, in the catalyst layer 4 on the upstream side, greater than or equal to 75 mass % Rh is carried on the AZ material of the support.

The experimental results, which will be described later, have verified that with the mass proportion of ACZ material/(ACZ material+AZ material) in the range of 0.33 to 0.5, the catalytic converter 10 that is excellent in both the OSC performance and the low-temperature activity performance ($NO_x$ purification performance) is realized.

Further, it has been also verified that with greater than or equal to 75 mass % Rh being carried on the AZ material of the support, the catalytic converter 10 that is excellent in both the OSC performance and the $NO_x$ purification performance is realized. Such a converter was realized because in order to deal with the problem that with a greater content of $CeO_2$ in the support in the catalyst layer 4 on the upstream side, the $NO_x$ purification performance, which is a characteristic of Rh, would degrade, greater than or equal to 75 mass % Rh was carried on the AZ material that does not contain $CeO_2$ in the support, so that the degradation of the $NO_x$ purification performance was suppressed.

Meanwhile, in a catalyst layer 3A shown in FIG. 4, the lengths of a catalyst layer 4A on the upstream side and a catalyst layer 5A on the downstream side are both 60% of the total length of the substrate 1, and thus 20% of the catalyst layer 4A and 20% of the catalyst layer 5A in length overlap with each other and in the portion where the catalyst layers overlap with each other, the catalyst layer 5A on the downstream side is arranged on the surface of the substrate 1 and the catalyst layer 4A on the upstream side is arranged on the surface of the catalyst layer 5A on the downstream side.

In addition, a catalyst layer 3B shown in FIG. 5 has a lower catalyst layer 5B arranged on the surface of the substrate 1 and an upper catalyst layer 4B arranged on the surface of the lower catalyst layer 5B.

Moreover, the upper catalyst layer 4B and the lower catalyst layer 5B are configured similarly to the aforementioned catalyst layers 4 and 4A on the upstream side and catalyst layers 5 and 5A on the downstream side, respectively.

As the upper catalyst layer 4B is configured similarly to the aforementioned catalyst layers 4 and 4A on the upstream side, a catalytic converter that is excellent in both the OSC performance and the $NO_x$ purification performance is realized.

(Experiments for Verifying OSC Performance and Low-Temperature Activity Performance in Relation to the ACZ Proportion in a Support in an Upper Catalyst Layer and Verifying OSC Performance and $NO_x$ Purification Performance in Relation to the Rh Rate in an AZ Material in an Upper Catalyst Layer, and the Results Thereof)

The inventors evaluated the performance of catalytic converters by producing catalyst slurry and catalytic converters using methods described below and by conducting endurance tests thereon, so that the optimal ranges of the ACZ proportion in a support in an upper catalyst layer and the Rh rate in an AZ material in the upper catalyst layer were defined. Five types of catalyst layers of Examples 1 and 2 and Comparative Examples 1 to 3 shown in Table 1 below and five types of catalyst layers of Examples 3 and 4 and Comparative Examples 4 to 6 shown in Table 2 below were produced, so that a catalytic converter having each of the catalyst layers was produced to conduct the endurance test thereon.

(Regarding Methods for Producing Catalyst Layers)

First, using nitric acid Pd, Pd/$Al_2O_3$ (Material 1) in which Pd is carried on $Al_2O_3$ was prepared. Impregnation was used as a method for causing Pt to be carried on $Al_2O_3$. Next, Slurry 1 was prepared by pouring Material 1, a $CeO_2$—$ZrO_2$ binary composite oxide (CZ material), sulfuric acid Ba, and an $Al_2O_3$-based binder into distilled water while agitating them such that the materials were suspended in the distilled water. Further, the prepared Slurry 1 was poured onto a substrate, and unnecessary portions were blown away with a blower, so that the wall surface of the substrate was coated with the materials. At that time, the coating materials for the Pd layer were prepared such that the content of Pd, the content of Material 1, the content of the CZ material, and the content of sulfuric acid Ba with respect to the volume of the substrate were 0.2 g/L, 25 g/L, 30 g/L, and 2.5 g/L, respectively. Finally, moisture was dried with a dryer kept at 120° C. for two hours, and baking was performed with an electric furnace at 500° C. for two hours.

Likewise, using nitric acid Rh, a Rh/AZ material (Material 2) in which Rh is carried on the AZ material was prepared. Next, Slurry 2 was prepared by pouring Material 2, an ACZ material, $Al_2O_3$, and an $Al_2O_3$-based binder into distilled water while agitating them such that the materials were suspended in the distilled water. The prepared Slurry 2 was poured onto a substrate, and unnecessary portions were blown away with a blower, so that the wall surface of the substrate was coated with the materials. At that time, the coating materials for the Rh layer were prepared such that the content of Rh, the content of Material 2 and ACZ material, and the content of $Al_2O_3$ with respect to the volume of the substrate were 0.12 g/L, the proportion shown in Table 1, and 20 g/L, respectively. Finally, moisture was dried with a dryer kept at 120° C. for two hours, and baking was performed with an electric furnace at 500° C. for two hours.

In summary, in each of the catalyst layers with a two-layer structure of Comparative Examples 1 to 3 and Examples 1 and 2 shown in Table 1, the lower catalyst layer (Pd layer) contains Pd (0.2 g/L)/$Al_2O_3$ (25 g/L)+CZ material (30 g/L)+sulfuric acid Ba (2.5 g/L), and the upper catalyst layer (Rh layer) contains Rh (0.12 g/L)/AZ material (X g/L)+ACZ material (Y g/L)+$Al_2O_3$ (20 g/L). The content of the AZ material (X g/L) and the content of the ACZ material (Y g/L) in the Rh layer in each of Examples and Comparative Examples are shown in Table 1.

TABLE 1

|  | AZ material (g/L) | ACZ material (g/L) | Proportion of ACZ material (ACZ/(ACZ + AZ)) |
|---|---|---|---|
| Comparative Example 1 | 105 | 0 | 0 |
| Comparative Example 2 | 87.5 | 17.5 | 0.17 |
| Example 1 | 70 | 35 | 0.33 |
| Example 2 | 52.5 | 52.5 | 0.50 |
| Comparative Example 3 | 0 | 105 | 1.00 |

Meanwhile, in the production of Examples 3 and 4 and Comparative Examples 4 to 6, the lower catalyst layers (Pd layers) were produced using the same production methods as those used for Examples 1 and 2 and Comparative Examples 1 to 3.

Next, using nitric acid Rh, a Rh/AZ material (Material 2) in which Rh is carried on the AZ material and a Rh/ACZ material (Material 3) in which Rh is carried on the ACZ material were prepared. It should be noted that the percentage of Rh carried in each of Examples 3 and 4 and Comparative Examples 4 to 6 is shown in Table 2.

Next, Slurry 3 was prepared by pouring Material 2, Material 3, $Al_2O_3$, and an $Al_2O_3$-based binder into distilled water while agitating them such that the materials were suspended in the distilled water. The prepared Slurry 3 was poured onto a substrate, and unnecessary portions were blown away with a blower, so that the wall surface of the substrate was coated with the materials. At that time, the coating materials for the Rh layer were prepared such that the content of Rh, the content of Material 2, the content of Material 3, and the content of $Al_2O_3$ with respect to the volume of the substrate were 0.12 g/L, 52.5 g/L, 52.5 g/L, and 20 g/L, respectively. Finally, moisture was dried with a dryer kept at 120° C. for two hours, and baking was performed with an electric furnace at 500° C. for two hours.

In summary, in each of the catalyst layers with a two-layer structure of Comparative Examples 4 to 6 and Examples 3 and 4 shown in Table 2, the lower catalyst layer (Pd layer) contains Pd (0.2 g/L)/$Al_2O_3$ (25 g/L)+CZ material (30 g/L)+sulfuric acid Ba (2.5 g/L), and the upper catalyst layer (Rh layer) contains Rh (X g/L)/AZ material (52.5 g/L)+Rh (0.12-X g/L)/ACZ material (52.5 g/L)+$Al_2O_3$ (20 g/L). The percentage of Rh (X g/L) carried on the AZ material and the percentage of Rh (0.12-X g/L) carried on the ACZ material in the Rh layer in each of Examples and Comparative Examples are shown in Table 2.

TABLE 2

|  | Percentage of Rh carried (%) | |
|---|---|---|
|  | AZ material | ACZ material |
| Comparative Example 4 | 0 | 100 |
| Comparative Example 5 | 25 | 75 |
| Comparative Example 6 | 50 | 50 |
| Example 3 | 75 | 25 |
| Example 4 | 100 | 0 |

(Regarding Endurance Test)

Each of the catalytic converters was mounted on the exhaust system of a 4.3 L V8 cylinder gasoline engine, and an endurance test was conducted thereon for 50 hours at a floor temperature of 1000° C. on condition that feedback, fuel cut, rich, and lean were included per minute.

(Regarding Evaluation Method)

A catalyst converter that had degraded was mounted on the exhaust system and the entering gas temperature was increased by 20° C. per minute, so that the low-temperature activity was evaluated at a temperature at which the purification rate reached 50%. Further, a catalytic converter that had degraded was mounted on the exhaust system, so that the $NO_x$ purification performance in a steady rich state was evaluated with the amount of $NO_x$ exhausted when the entering gas atmosphere was continuously maintained on the rich side of the A/F ratio. Furthermore, a catalytic converter that had degraded was mounted on the exhaust system and the entering gas atmosphere was switched between the rich and lean sides of the A/F ratio, so that the OSC performance was evaluated through the calculation of the OSC from the behavior of a sensor provided on the downstream side of the catalyst in response to the switching.

Figure 6:
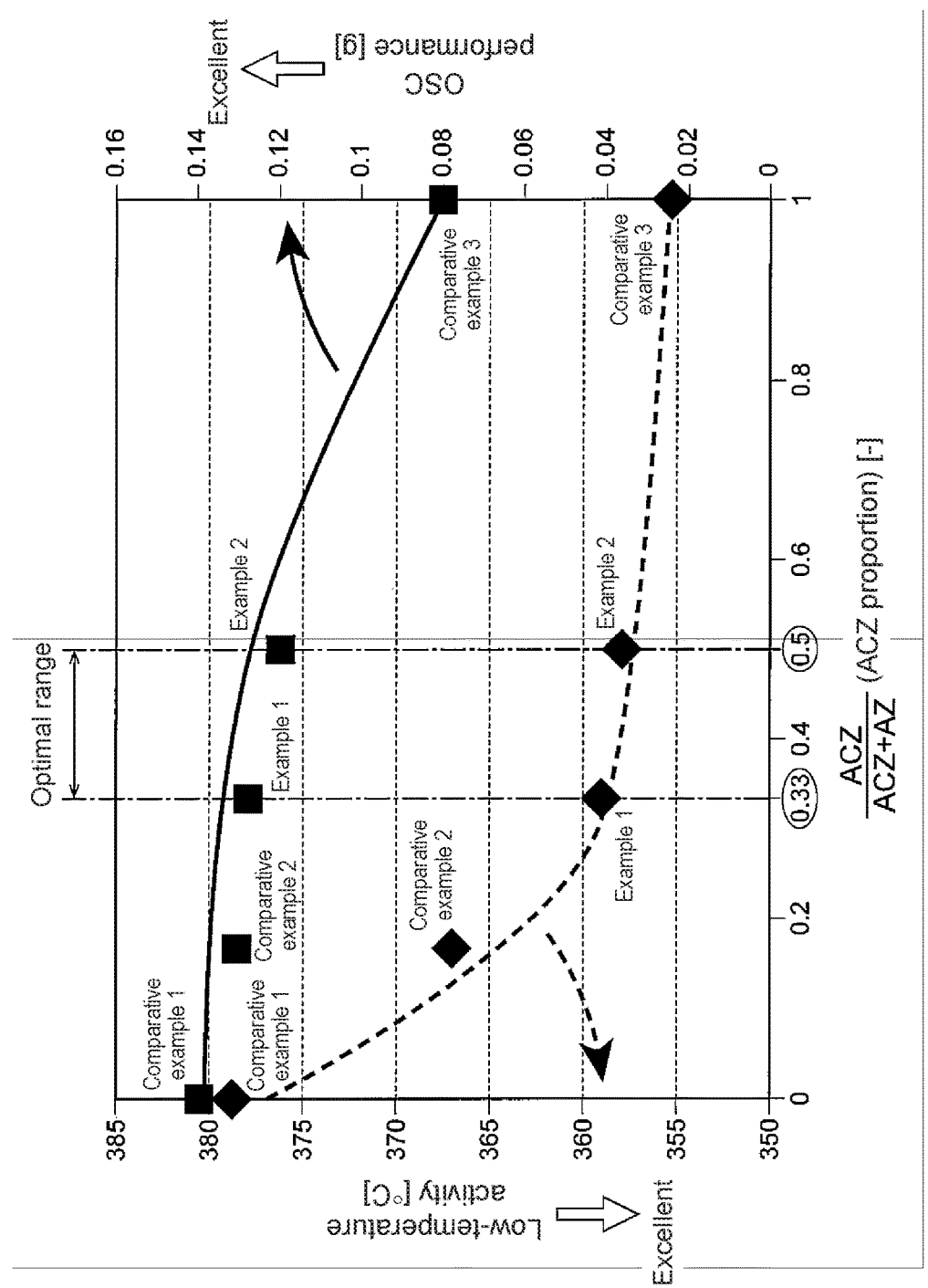
FIG. 6 is a graph showing the experimental results of verification of OSC performance and low-temperature activity performance in relation to the ACZ ratio in a support in an upper catalyst layer.
Figure 7:
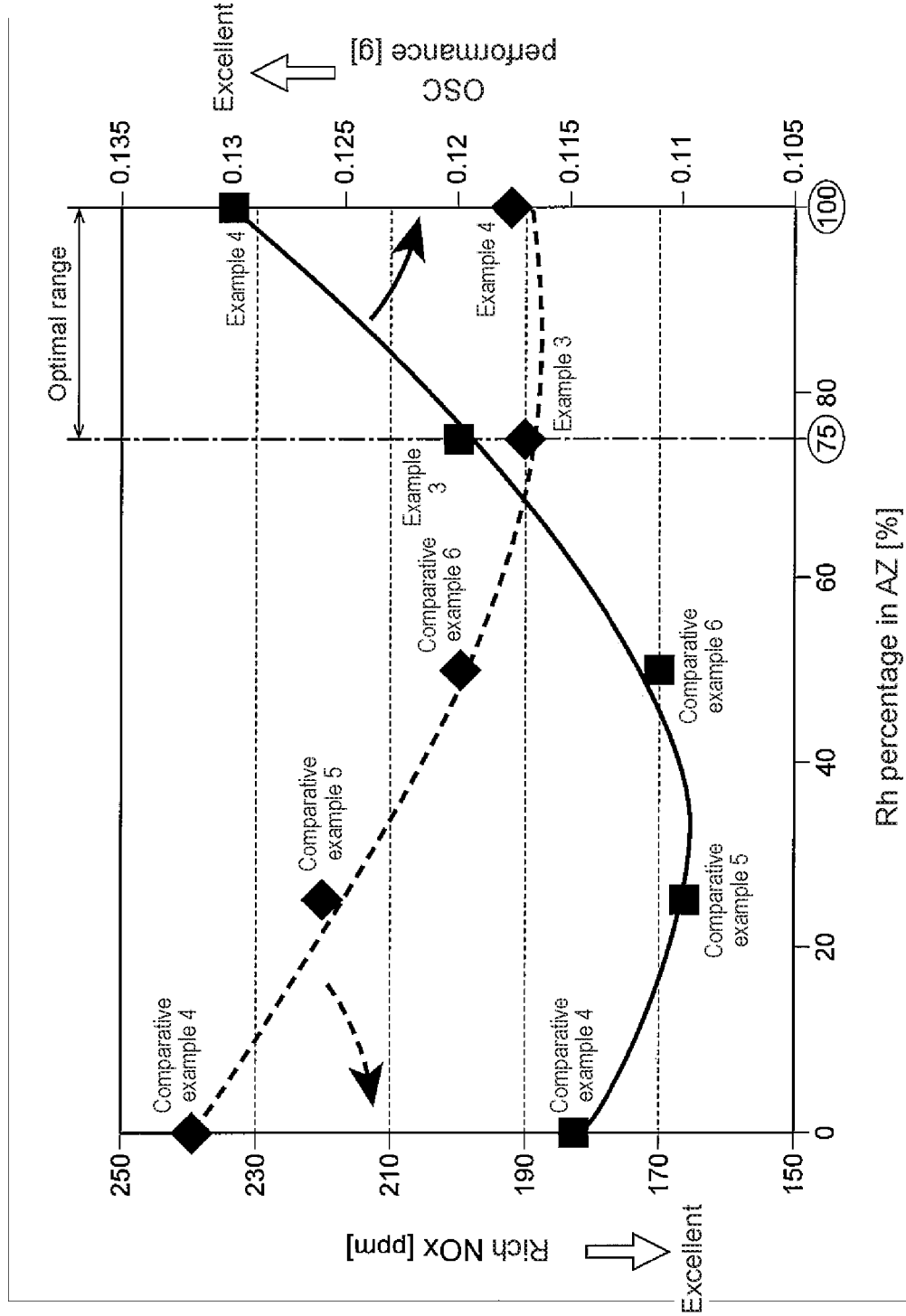
FIG. 7 is a graph showing the experimental results of verification of the OSC performance and the $NO_x$ purification performance in relation to the Rh rate in an AZ material in the upper catalyst layer.

FIG. 6 shows the experimental results of the verification of the OSC performance and low-temperature activity performance in relation to the ACZ proportion in the support in the upper catalyst layer, and FIG. 7 shows the experimental results of the verification of the OSC performance and $NO_x$ purification performance in relation to the Rh percentage in the AZ material in the upper catalyst layer.

FIG. 6 can confirm that with the mass proportion of ACZ material/(ACZ material+AZ material) in the range of 0.33 to 0.5, which is in the range between the mass proportions of Example 1 and Example 2, excellent OSC performance and low-temperature activity performance are both obtained. In accordance with the experimental results, the mass proportion of ACZ material/(ACZ material+AZ material) in the support in the upper catalyst layer was defined to be in the range of 0.33 to 0.5.

Meanwhile, FIG. 7 can confirm that with greater than or equal to 75 mass % (and less than or equal to 100 mass %) Rh, which is in the range between the mass percentages of Example 3 and Example 4, excellent OSC performance and $NO_x$ purification performance are both obtained. In accordance with the experimental results, the ratio of Rh carried on the AZ material in the support in the upper catalyst layer was defined to be greater than or equal to 75 mass %.

Although the embodiments of the present disclosure have been described in detail with reference to the drawings, specific structures are not limited thereto, and any design changes that may occur within the spirit and scope of the present disclosure are all included in the present disclosure.

DESCRIPTION OF SYMBOLS

1 Substrate
2 Cell wall
3, 3A, 3B Catalyst layers
4, 4A Catalyst layers on the upstream side
5, 5A Catalyst layers on the downstream side
4B Upper catalyst layer
5B Lower catalyst layer
10 Catalytic converter
Fr Upstream side in the exhaust gas flow direction
Rr Downstream side in the exhaust gas flow direction

What is claimed is:

1. A catalytic converter comprising:
a substrate with a cell structure through which exhaust gas flows; and
a catalyst layer formed on a cell wall surface of the substrate,
wherein:
the catalyst layer has a catalyst layer on an upstream side arranged on the upstream side in an exhaust gas flow direction on the substrate, and a catalyst layer on a downstream side arranged on the downstream side in the exhaust gas flow direction on the substrate,
the catalyst layer on the upstream side includes a support containing an $Al_2O_3$—$CeO_2$—$ZrO_2$ ternary composite oxide and an $Al_2O_3$—$ZrO_2$ binary composite oxide, and at least Rh that is a noble metal catalyst carried on the support,
the catalyst layer on the downstream side includes a support, and Pd or Pt that is a noble metal catalyst carried on the support,
in the support in the catalyst layer on the upstream side, a mass proportion of the $Al_2O_3$—$CeO_2$—$ZrO_2$ ternary composite oxide/(the $Al_2O_3$—$CeO_2$—$ZrO_2$ ternary composite oxide+the $Al_2O_3$—$ZrO_2$ binary composite oxide) is in a range of 0.33 to 0.5, and
in the catalyst layer on the upstream side, greater than or equal to 75 mass % Rh is carried on the $Al_2O_3$—$ZrO_2$ binary composite oxide of the support.

2. The catalytic converter according to claim 1, wherein:
the catalyst layer on the upstream side and the catalyst layer on the downstream side partially overlap with each other, and
in a portion where the catalyst layer on the upstream side and the catalyst layer on the downstream side partially overlap with each other, the catalyst layer on the downstream side is arranged on a surface of the substrate, and the catalyst layer on the upstream side is arranged on a surface of the catalyst layer on the downstream side.

3. A catalytic converter comprising:
a substrate with a cell structure through which exhaust gas flows; and
a catalyst layer formed on a cell wall surface of the substrate,
wherein:
the catalyst layer has a lower catalyst layer arranged on a surface of the substrate, and an upper catalyst layer arranged on a surface of the lower catalyst layer,
the upper catalyst layer includes a support containing an $Al_2O_3$—$CeO_2$—$ZrO_2$ ternary composite oxide and an $Al_2O_3$—$ZrO_2$ binary composite oxide, and at least Rh that is a noble metal catalyst carried on the support,
the lower catalyst layer includes a support, and Pd or Pt that is a noble metal catalyst carried on the support,
in the support in the upper catalyst layer, a mass proportion of the $Al_2O_3$—$CeO_2$—$ZrO_2$ ternary composite oxide/(the $Al_2O_3$—$CeO_2$—$ZrO_2$ ternary composite oxide+the $Al_2O_3$—$ZrO_2$ binary composite oxide) is in a range of 0.33 to 0.5, and
in the upper catalyst layer, greater than or equal to 75 mass % Rh is carried on the $Al_2O_3$—$ZrO_2$ binary composite oxide of the support.

* * * * *